US009859545B2

(12) United States Patent
Yoshioka et al.

(10) Patent No.: US 9,859,545 B2
(45) Date of Patent: Jan. 2, 2018

(54) POWER SUPPLY DEVICE

(71) Applicant: Yazaki Corporation, Minato-ku, Tokyo (JP)

(72) Inventors: Nobuaki Yoshioka, Kakegawa (JP); Kazuaki Kai, Kakegawa (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 653 days.

(21) Appl. No.: 14/250,565

(22) Filed: Apr. 11, 2014

(65) Prior Publication Data
US 2014/0220420 A1 Aug. 7, 2014

Related U.S. Application Data

(63) Continuation of application No. PCT/JP2012/076959, filed on Oct. 18, 2012.

(30) Foreign Application Priority Data

Oct. 19, 2011 (JP) .................................. 2011-229803

(51) Int. Cl.
H01M 2/24 (2006.01)
H01M 2/20 (2006.01)
(Continued)

(52) U.S. Cl.
CPC ............ H01M 2/206 (2013.01); H01M 10/02 (2013.01); H01M 10/482 (2013.01); H01M 2010/4271 (2013.01); H01M 2220/20 (2013.01)

(58) Field of Classification Search
CPC .......... H01M 2/206; H01M 2/10; H01M 2/20; H01M 10/02; H01M 10/482; H01M 2010/4271; H01M 2220/20
See application file for complete search history.

(56) References Cited

U.S. PATENT DOCUMENTS

2010/0055993 A1 3/2010 Ikeda et al.
2010/0073005 A1 3/2010 Yano et al.
(Continued)

FOREIGN PATENT DOCUMENTS

CN 101997106 A 3/2011
JP 2001-256936 A 9/2001
(Continued)

OTHER PUBLICATIONS

Communication dated Feb. 9, 2016, from the Japanese Patent Office in corresponding application No. 2011229803.
(Continued)

Primary Examiner — Raymond Alejandro
(74) Attorney, Agent, or Firm — Sughrue Mion, PLLC

(57) ABSTRACT

A power supply device includes: a battery assembly including stacked battery cells and electrodes of the battery cells, the electrodes of the adjacent battery cells being arranged to face each other; a connecting portion of an electric wire for voltage detection directly connected to a pair of the electrodes of the adjacent battery cells arranged to face each other; and an insulating block body disposed on a side on which the electrodes of the battery assembly project, including the electric wire for voltage detection wired in the insulating block body, and configured to hold the connecting portion of the electric wire for voltage detection.

8 Claims, 10 Drawing Sheets

(51) Int. Cl.
    *H01M 10/02*     (2006.01)
    *H01M 10/48*     (2006.01)
    *H01M 10/42*     (2006.01)

(56) References Cited

U.S. PATENT DOCUMENTS

2011/0045329 A1    2/2011    Ikeda et al.
2011/0076531 A1*    3/2011    Lee ............... H01M 2/0245
                                                             429/90
2011/0195285 A1    8/2011    Shin et al.

FOREIGN PATENT DOCUMENTS

| | | | | |
|---|---|---|---|---|
| JP | 2005-222701 | * | 8/2005 | ............ H01M 2/10 |
| JP | 2005-222701 A | | 8/2005 | |
| JP | 2007-073510 A | | 3/2007 | |
| JP | 2008-146943 A | | 6/2008 | |
| JP | 2010-055885 A | | 3/2010 | |
| JP | 2010-080135 A | | 4/2010 | |
| JP | 201149047 A | | 3/2011 | |
| JP | 2011-108408 A | | 6/2011 | |
| JP | 2012-138284 A | | 7/2012 | |
| WO | 2010/128792 A2 | | 11/2010 | |
| WO | 2010/137156 A1 | | 12/2010 | |
| WO | 2011045841 A1 | | 4/2011 | |

OTHER PUBLICATIONS

Communication dated Jul. 28, 2015 from the Japanese Patent Office in counterpart application No. 2011-229803.
Communication dated Jun. 5, 2015 from the European Patent Office in counterpart European Application No. 12841801.9.
International Search Report of PCT/JP2012/076959 dated Jan. 15, 2013.
Communication dated Jul. 30, 2015, issued by the State Intellectual Property Office of the People's Republic of China in corresponding Chinese Application No. 201280051527.6.

* cited by examiner

POWER SUPPLY DEVICE

CROSS REFERENCE TO RELATED APPLICATION

This application is a Continuation of PCT Application No. PCT/JP2012/076959, filed on Oct. 18, 2012, and claims the priority of Japanese Patent Application No. 2011-229803, filed on Oct. 19, 2011, the content of both of which is incorporated herein by reference.

BACKGROUND

1. Technical Field

The present invention relates to a power supply device having a plurality of stacked battery cells.

2. Related Art

In hybrid vehicles and electric vehicles, a power supply device as a drive source of an electric motor is mounted, for example. For this type of related power supply device, there is one disclosed in Japanese Unexamined Patent Application Publication No. 2010-55885. As shown in FIGS. 1 and 2, a power supply device 50 includes a battery assembly 51 in which a plurality of stacked battery cells 52 are arranged in two rows. A pair of electrodes (a plus electrode and a minus electrode) 52a and 52b are projectingly provided on the upper surface of each of the battery cells 52. The pair of electrodes 52a and 52b of the battery cell 52 adjacent to each other are connected to each other by a connection terminal 53 and two pinching terminals 54 and 55. The connection terminal 53 is formed by a bus bar and has a pair of contact piece portions 53a and 53b corresponding to the directions of the electrodes 52a and 52b to be connected to the connection terminal 53. The two pinching terminals 54 and 55 are each formed by a bus bar and pinch any one of the electrodes 52a and 52b and any one of the contact piece portions 53a and 53b of the connection terminal 53. The pinching terminal 54 has an integrally provided tuning fork terminal 54A. The tuning fork terminal 54A is connected to an electric wire W for voltage detection by press-fitting. The connection terminal 53 and the two pinching terminals 54 and 55 are integrally fixed by an attachment member 56 formed of a synthetic resin.

In the above related example, each of the battery cells 52 of the battery assembly 51 is connected in series through the connection terminal 53 and the two pinching terminals 54 and 55. Voltage information at an electrode position of each of the battery cells 52 is output through the electric wire W for voltage detection connected to the tuning fork terminal 54A. According to this constitution, an output state of each of the battery cells 52 can be detected.

SUMMARY

However, in the above related example, in order to obtain the inter-electrode connection of the adjacent battery cells 52 and the voltage information at the electrode position of the battery cell 52, the attachment member 56 is used with the connection terminal 53 and the two pinching terminals 54 and 55. Since the connection terminal 53, the two pinching terminals 54 and 55, and the attachment member 56 are necessary for each electrode connecting portion, the number of components, working man-hours, and so on are increased in accordance with the increase of the number of the battery cells 52. Further, since an installation space for the connection terminal 53 and the two pinching terminals 54 and 55 is necessary for each connecting portion between electrodes, the size and weight of the power supply device 50 are increased.

An object of the present invention is to provide a power supply device which can suppress increases in the number of components and working man-hours as much as possible even if the number of the battery cells increases and can contribute to size reduction and weight saving of its own device.

A power supply device in accordance with some embodiments includes: a battery assembly including stacked battery cells and electrodes of the battery cells, the electrodes of the adjacent battery cells being arranged to face each other; a connecting portion of an electric wire for voltage detection directly connected to a pair of the electrodes of the adjacent battery cells arranged to face each other; and an insulating block body disposed on a side on which the electrodes of the battery assembly project, including the electric wire for voltage detection wired in the insulating block body, and configured to hold the connecting portion of the electric wire for voltage detection.

The connecting portion of the electric wire for voltage detection may be a conductor derived from the electric wire for voltage detection.

The connecting portion of the electric wire for voltage detection may be held between the pair of the electrodes.

According to the above constitution, since the connecting portion of the electric wire for voltage detection held by the insulating block body and the pair of electrodes of the adjacent battery cells are directly connected to each other, the connection between the pair of electrodes and the voltage information at the electrode position can be obtained with the smaller number of components than that in the relevant examples. Accordingly, even if the number of the battery cells increases, the increases in the number of components and the working man-hours can be suppressed as much as possible, and, in addition, size reduction and weight saving of the power supply device can be achieved.

DETAILED DESCRIPTION

Figure 1:
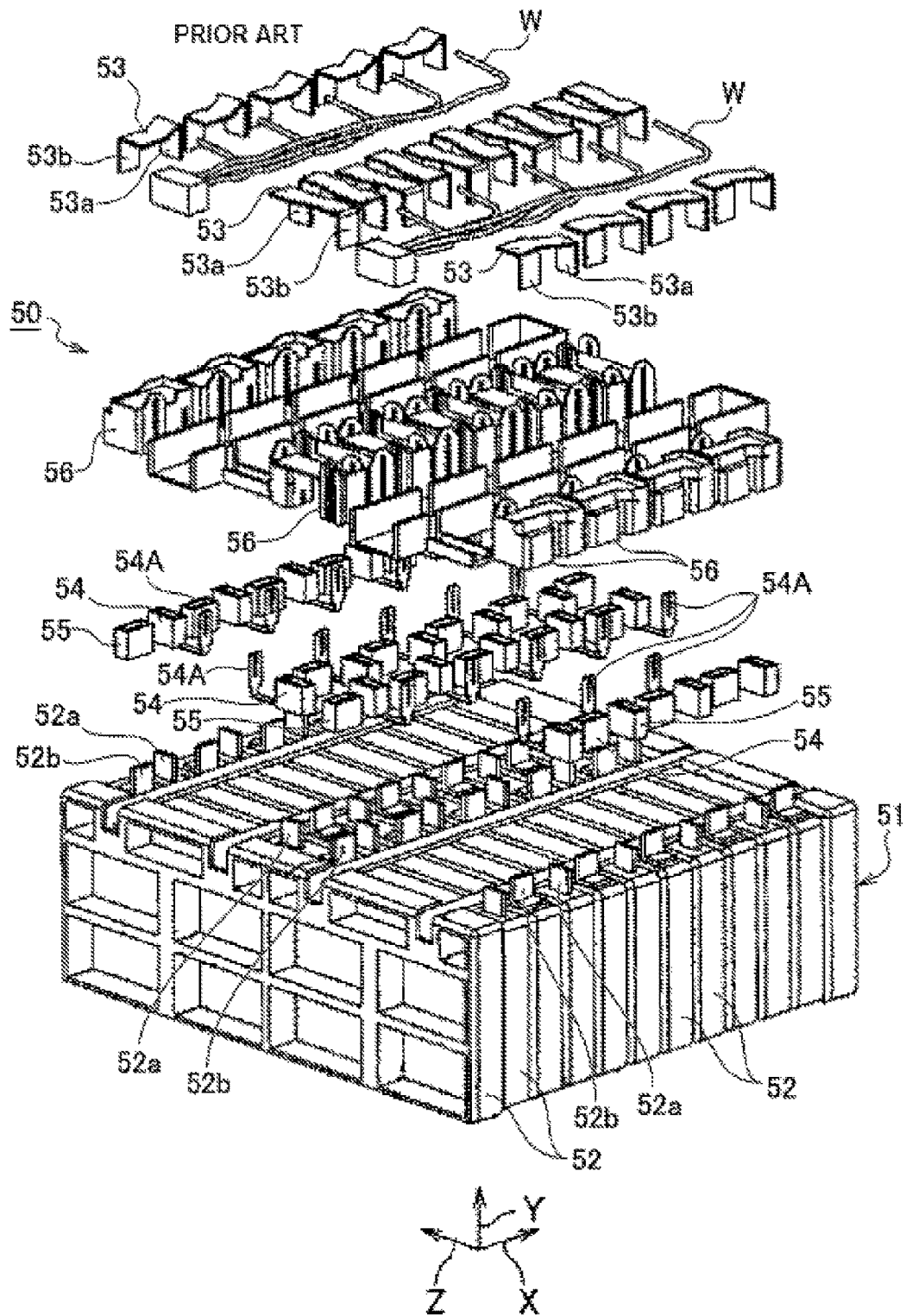
FIG. 1 is an exploded perspective view of a power supply device in a related example.
Figure 2:
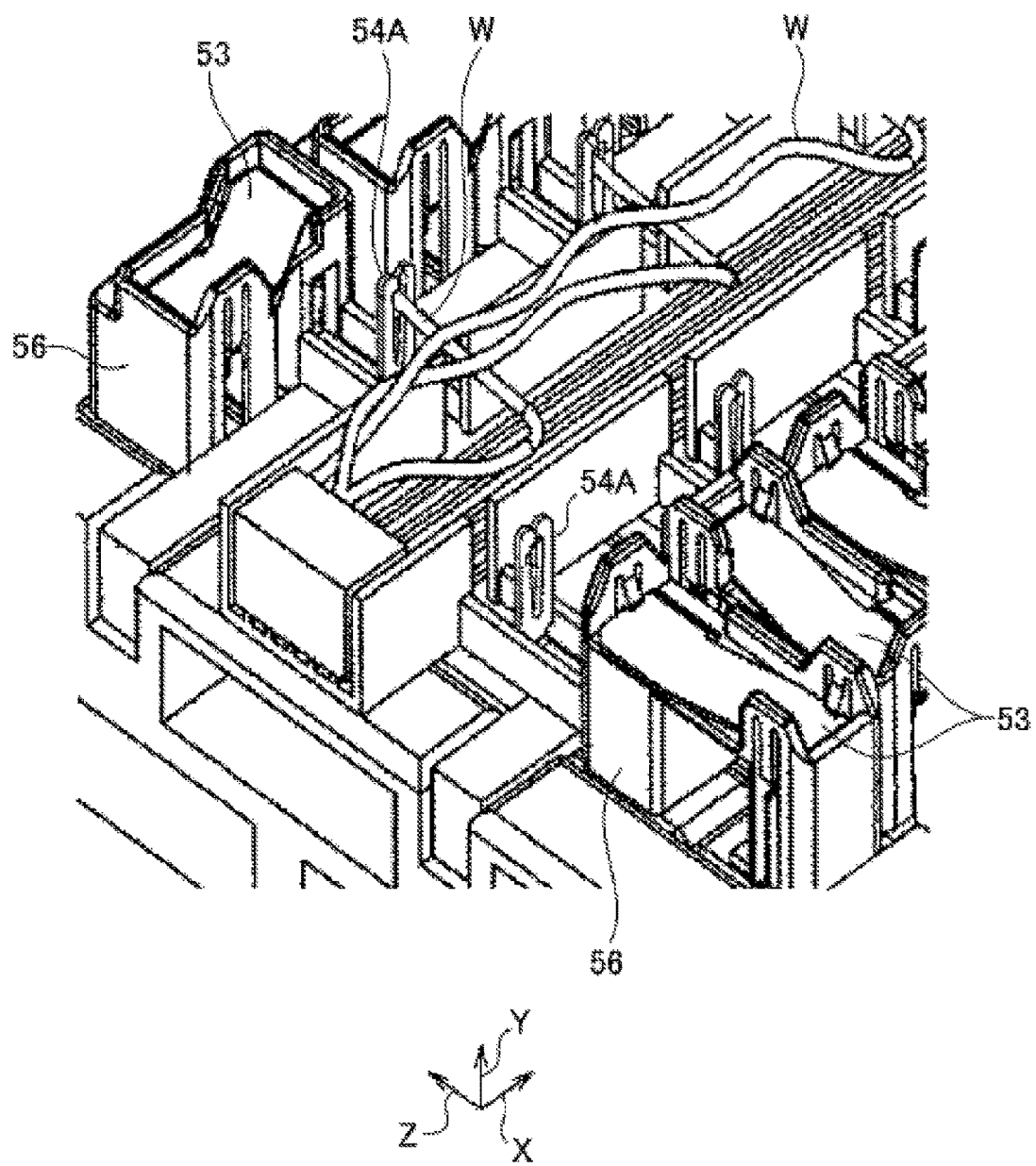
FIG. 2 is an enlarged perspective view of a relevant portion of the power supply device in the related example.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In the following, an embodiment of the present invention will be described in detail with reference to the drawings.

First Embodiment

Figure 3:
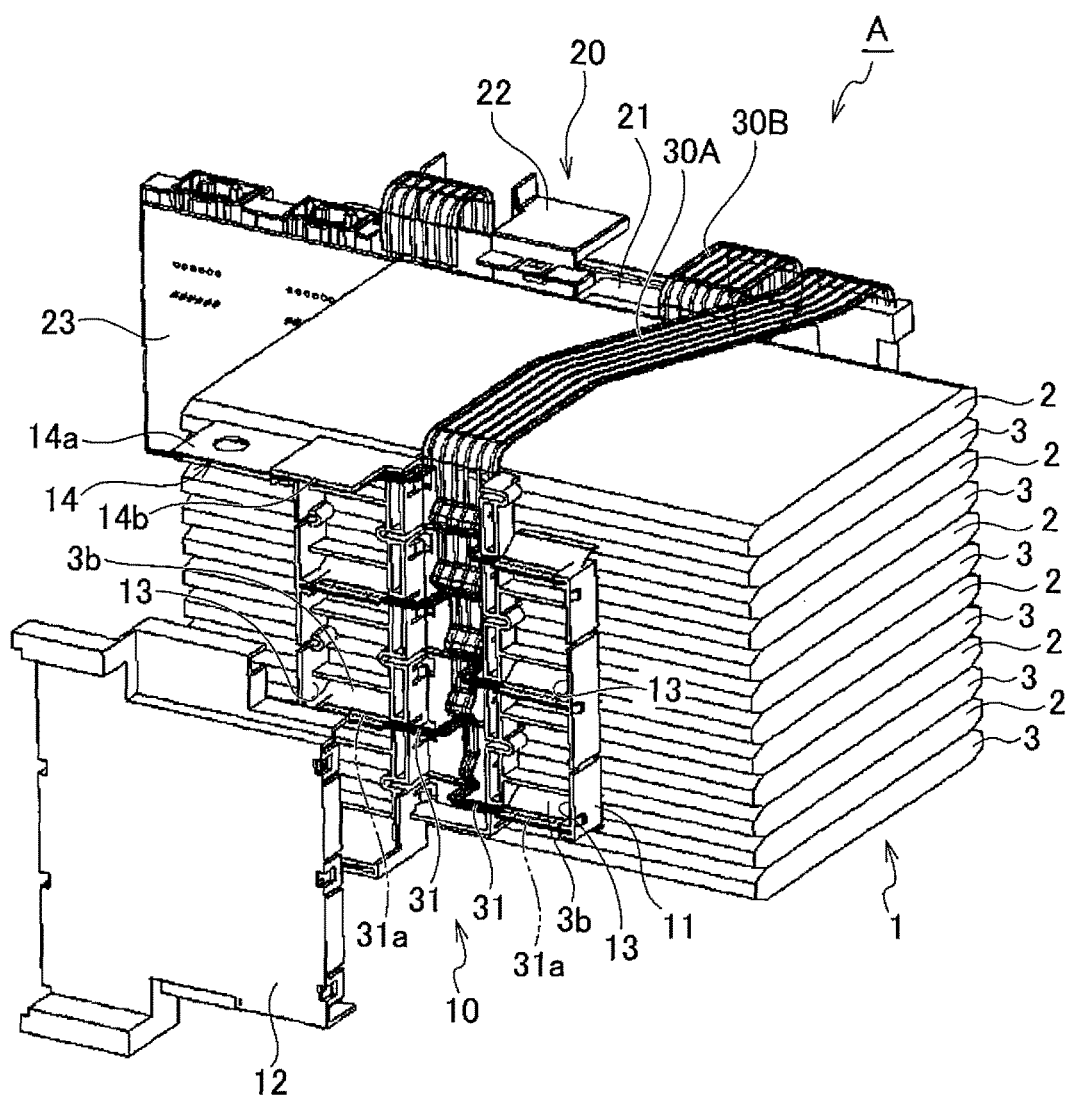
FIG. 3 shows a first embodiment of the present invention and is a perspective view of a power supply device.

FIGS. 3 to 8 show a first embodiment of the present invention. As shown in FIGS. 3, 4A, and 4B, a power supply device A includes a battery assembly 1 constituted of a plurality of (twelve) stacked battery cells 2 and 3, a pair of insulating block bodies 10 and 20 arranged on both sides of the battery assembly 1, and two flat cables 30A and 30B as electric wires for voltage detection.

Figure 5A:
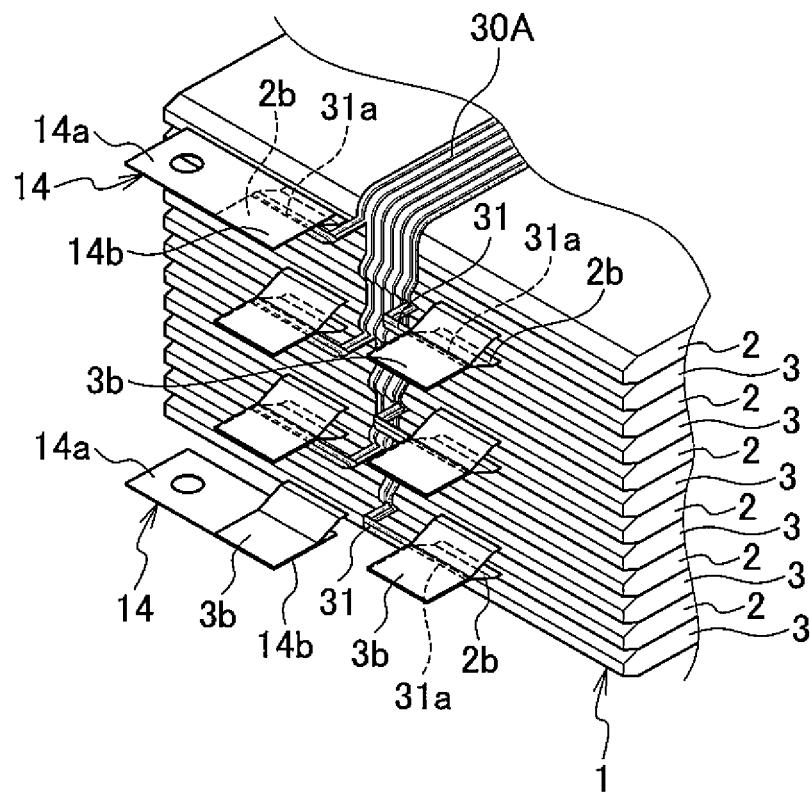
FIG. 5A is a perspective view showing a connection state between a flat cable and an electrode of each battery cell according to the first embodiment of the present invention.
Figure 5B:
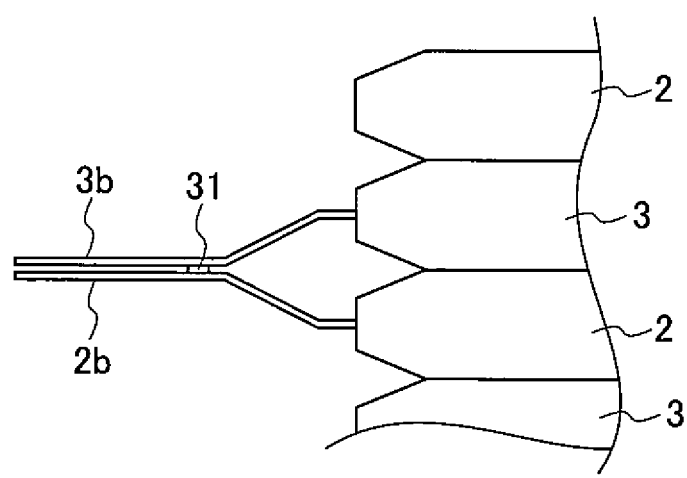
FIG. 5B is a cross-sectional view showing the connection state between the flat cable and the electrode of the battery cell according to the first embodiment of the present invention.
Figure 6:
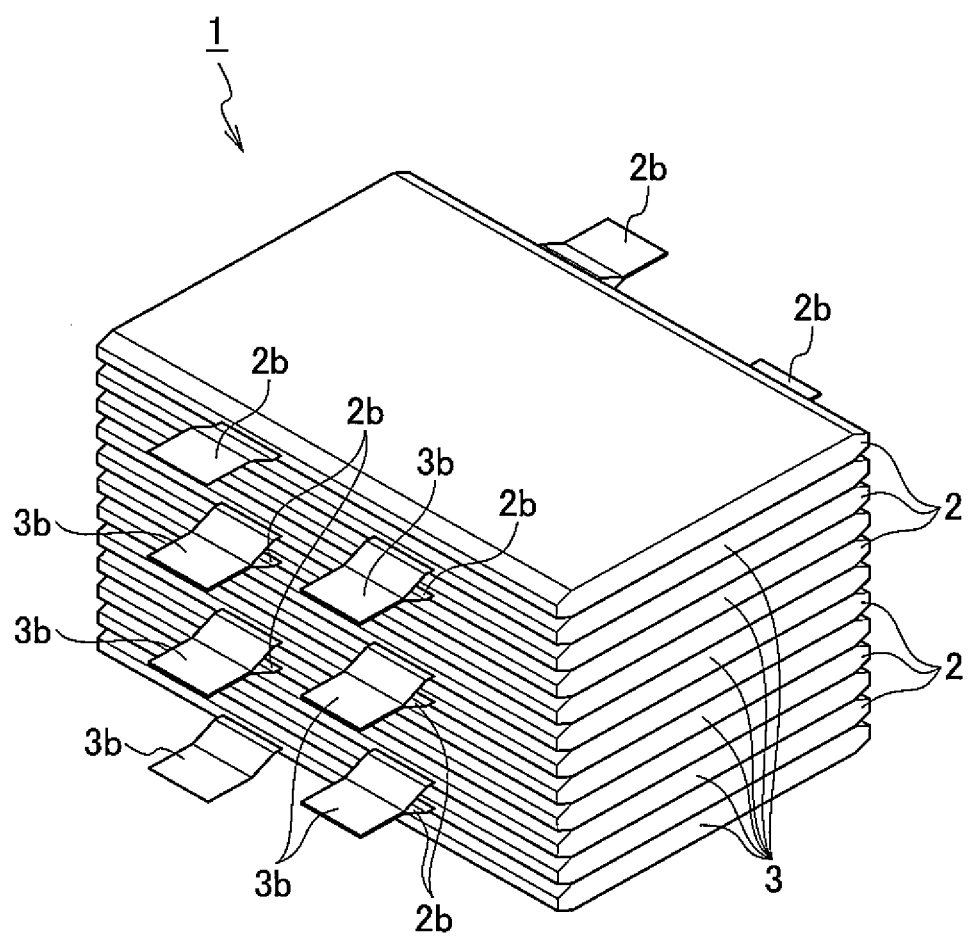
FIG. 6 shows the first embodiment of the present invention and is a perspective view of a battery assembly.

The battery assembly 1 is constituted of the twelve battery cells 2 and 3, as shown in FIGS. 5A, 5B, and 6. As the battery cells 2 and 3, two kinds of battery cells different in arrangement of electrodes 2b and 3b, that is, a first battery cell 2 and a second battery cell 3 are used.

Figure 7A:
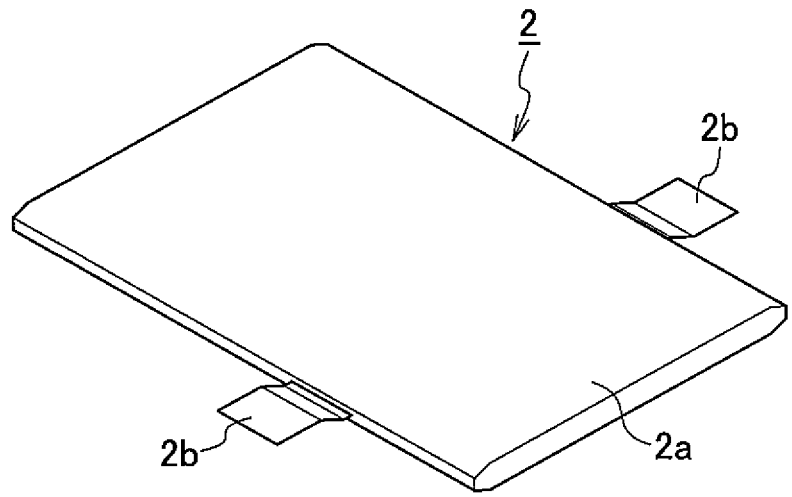
FIG. 7A is a perspective view of a first battery cell according to the first embodiment of the present invention.

As shown in FIG. 7A, the first battery cell 2 has a flat rectangular cell body 2a and a pair of electrodes (a plus electrode and a minus electrode) 2b projecting from left and right side surfaces of the cell body 2a. In the pair of the electrodes 2b, one projects on a front side of the cell body 2a, and the other projects on a back side of the cell body 2a. In addition, the electrodes 2b are arranged at a deviated position on the same side with respect to a centerline. When the front and rear sides are reversed to arrange the pair of the electrodes 2b, the electrodes 2b are located on the same positions in plan view so as to be horizontally reversed. Each of the electrodes 2b has a thin film shape (plate shape).

Figure 7B:
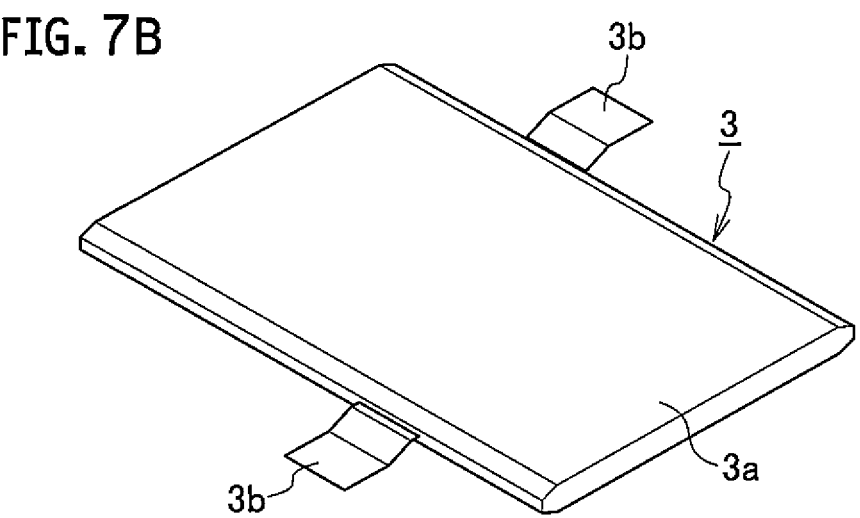
FIG. 7B is a perspective view of a second battery cell according to the first embodiment of the present invention.

As shown in FIG. 7B, the second battery cell 3 has a flat rectangular cell body 3a and a pair of electrodes (a plus electrode and a minus electrode) 3b projecting from left and right side surfaces of the cell body 3a. In the pair of the electrodes 3b, one projects on a front side of the cell body 3a, and the other projects on a back side of the cell body 3a. In addition, the electrodes 3b are arranged at a deviated position on the different sides with respect to a centerline. When the front and rear sides are reversed to arrange the electrodes 3b, the electrodes 3b are located at horizontally reversed positions in plan view. Each of the electrodes 3b has a thin film shape (plate shape).

As shown in FIGS. 5A, 5B, and 6, the first battery cells 2 and the second battery cells 3 configured as above are alternatively stacked to be adjacent to each other so that the electrode 2b of the first battery cell 2 and the electrode 3b of the second battery cell 3 having different polarities face each other in a firmly adhered state. According to this constitution, in the battery assembly 1, all the twelve battery cells 2 and 3 are connected in series.

Figure 8:
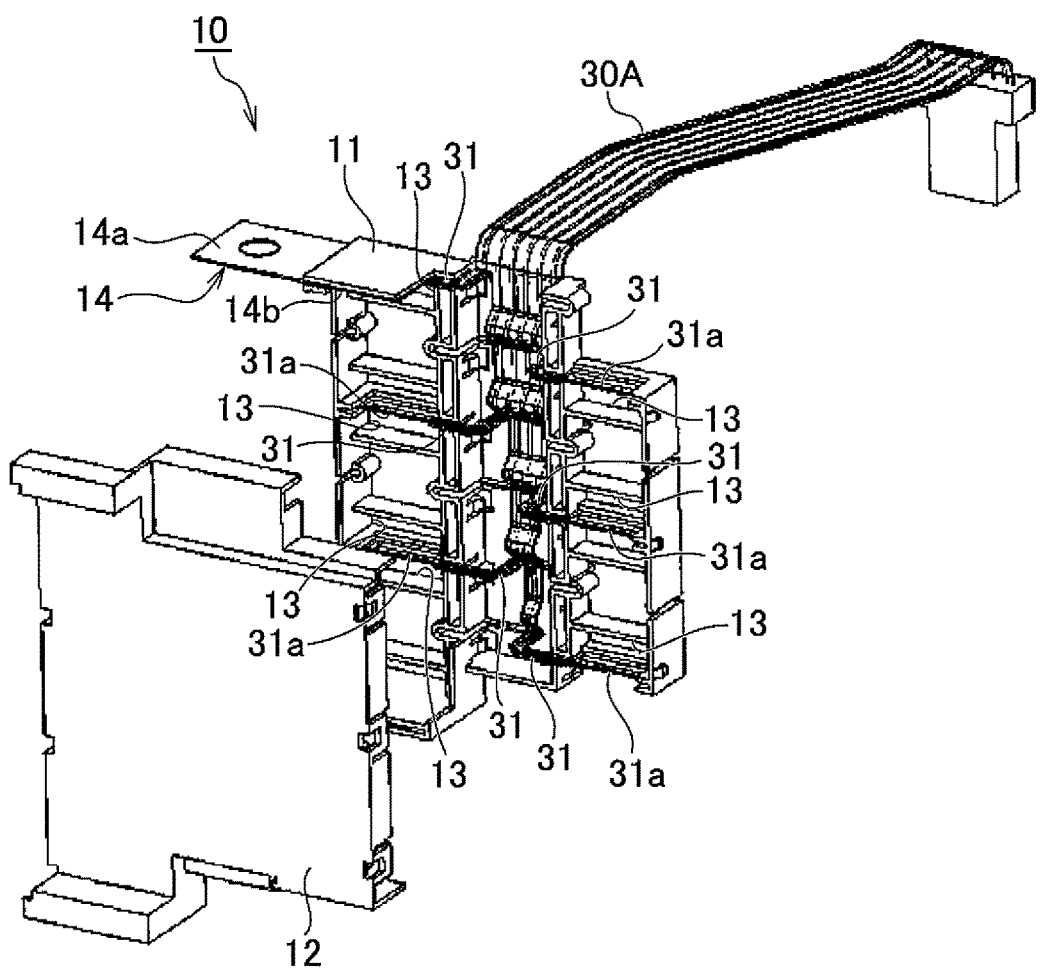
FIG. 8 shows the first embodiment of the present invention and is an exploded perspective view of one of insulating block bodies.

Meanwhile, the insulating block body 10 has an insulating case body 11 and an insulating cover 12, as shown in FIG. 8 and so on in detail. The insulating case body 11 has electrode insertion holes 13 opening at seven positions corresponding to the positions of the electrodes 2b and 3b projecting from one side of the battery assembly 1.

A pair of output terminals 14 is fixed to the insulating case body 11. One of the output terminals 14 is a plus-side output terminal, and the other is a minus-side output terminal. Each of the output terminals 14 is formed by a bus bar. Each of the output terminals 14 has a straight shape. In each of the output terminals 14, a portion thereof is exposed from each of the insulating case bodies 11, and the exposed portion is an external connecting portion 14a. The exposed portion of each of the output terminals 14 in each of the insulating case bodies 11 is an electrode connecting portion 14b. The electrode connecting portion 14b of the upper output terminal 14 is disposed in an inner space of the electrode insertion hole 13 at the uppermost position. The electrode connecting portion 14b of the lower output terminal 14 is disposed in an inner space of the electrode insertion hole 13 at the lowermost position.

In the insulating case body 11, a flat cable 30A is wired, and the front end side of the flat cable 30A is held. In the front end side of the flat cable 30A, six conductor portions are bifurcated by a slit. The six bifurcated cable portions 31 are installed while laterally traversing the inner space of each of the electrode insertion holes 13 (other than the electrode insertion hole 13 in the lowermost stage). A conductor 31a (shown in FIG. 5B) is exposed at the installation portion of each of the bifurcated cable portions 31. Namely, the conductor 31a itself of the flat cable 30A is configured as a connecting portion of an electric wire for voltage detection.

The electrodes 2b and 3b projecting on one side of the battery assembly 1 are inserted into each of the electrode insertion holes 13 of the insulating block body 10 (see, FIG. 3). The electrode 2b inserted into the electrode insertion hole 13 at the uppermost position is disposed to hold the conductor 31a of the bifurcated cable portion 31 with the electrode connecting portion 14b of the output terminal 14. The output terminal 14, the electrode 2b, and the conductor 31a are connected by resistance welding or the like. The electrode 3b inserted into the electrode insertion hole 13 at the lowermost position is firmly adhered to an upper surface of the connecting portion 14b of the output terminal 14. The output terminal 14 and the electrode 3b are connected by resistance welding or the like.

Each pair of the electrodes 2b and 3b inserted into the electrode insertion hole 13 at an intermediate position is arranged to hold the conductor 31a of the flat cable 30A between them, as shown in FIG. 5B. Each pair of the electrodes 2b and 3b and each of the conductors 31a of the flat cable 30A are connected by resistance welding or the like. Namely, the pair of the electrodes 2b and 3b is connected directly to the conductor 31a itself of the flat cable 30A.

The insulating cover 12 is mounted to close the opening side of the insulating case body 11. The insulating block body 10 insulates the electrodes 2b and 3b projecting on one side of the battery assembly 1.

Figure 4A:
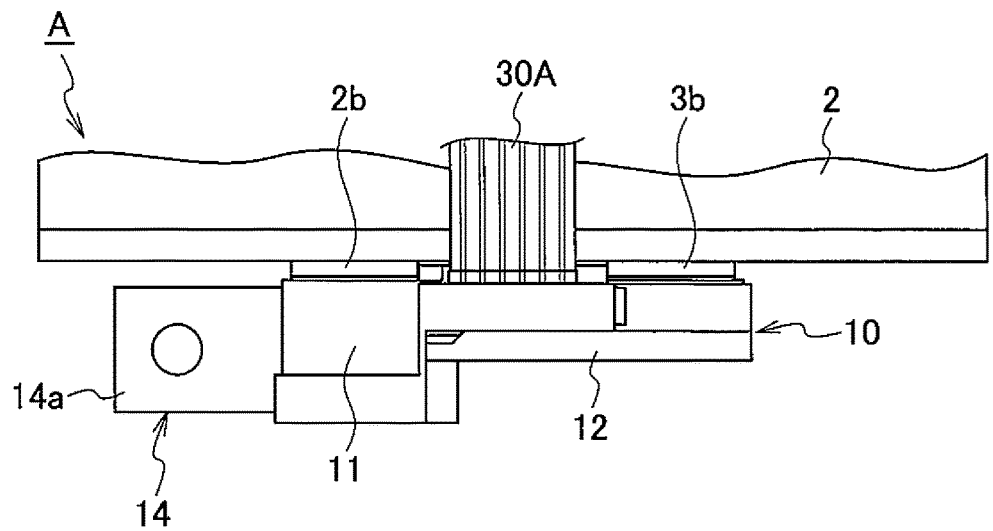
FIG. 4A is a plan view of a relevant portion of the power supply device according to the first embodiment of the present invention.
Figure 4B:
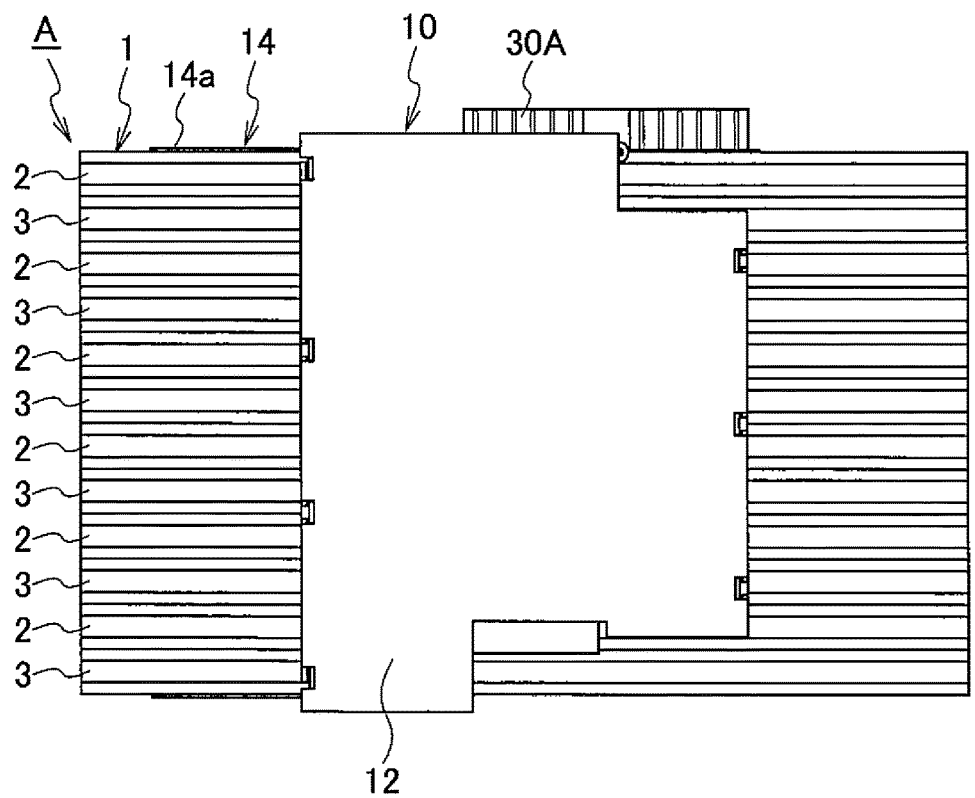
FIG. 4B is a side view of the power supply device according to the first embodiment of the present invention.

The other insulating block body 20 has an insulating case body 21 and an insulating cover 22, as shown in FIGS. 3, 4A, and 4B. In the insulating case body 21, the flat cable 30B is wired, and the front end side of the flat cable 30A is held, as in the insulating block body 10. In the flat cable 30B, the electrodes 2b and 3b projecting on the other side of the battery assembly 1 are connected by a structure similar to the above-described structure. The insulating block body 20 insulates the electrodes 2b and 3b projecting on the other side of the battery assembly 1.

A control substrate 23 is fixed to the insulating case body 21. In FIG. 3, the insulating case body 21 is in an open position. The other ends of the two flat cables 30A and 30B are connected to the control substrate 23. According to this constitution, voltage information at the position of each of the electrodes 2b and 3b is output to the control substrate 23. In the control substrate 23, presence of abnormality related to an output voltage of each of the battery cells 2 and 3 can be judged based on the information.

As described above, the battery assembly 1 and the insulating block bodies 10 and 20 are provided, and the pair of the electrodes 2b and 3b of the adjacent battery cells 2 and 3 which is arranged to face each other and the conductors 31a of the flat cables 30A and 30B as electric wires for voltage detection are directly connected to each other. Namely, since the conductors 31a of the flat cables 30A and 30B wired and held in the insulating block bodies 10 and 20 and the pair of the electrodes 2b and 3b of the adjacent battery cells 2 and 3 are directly connected to each other, the connection between the pair of the electrodes 2b and 3b and the voltage information of the electrode position can be obtained with the smaller number of components than that in the relevant examples. Accordingly, if the number of the battery cells 2 and 3 increases, the increases in the number of components and the working man-hours can be suppressed as much as possible, and, in addition, size reduction and weight saving of the power supply device can be achieved.

In this embodiment, each connecting portion of the flat cables 30A and 30B as the electric wires for voltage detection is the conductor 31a itself of the flat cables 30A and 30B. Accordingly, in order to obtain the connection between the pair of the electrodes 2b and 3b and the voltage information at the electrode position, accessory parts are not required at all, and therefore, even if the number of the battery cells 2 and 3 increases, the increases in the number of components and the working man-hours can be suppressed as much as possible, and, in addition, size reduction and weight saving of the power supply device can be satisfactorily achieved.

Each of the conductors 31a of the flat cables 30A and 30B is directly connected to the pair of the electrodes 2b and 3b in a state of being held between the pair of the electrodes 2b and 3b. Accordingly, connection reliability between the electrodes 2b and 3b and the flat cables 30A and 30B is enhanced.

The electric wires for voltage detection are the flat cables 30A and 30B. Accordingly, even if the number of the battery cells 2 and 3 of the battery assembly 1 increases, the increase in a wiring space of the electric wires for voltage detection can be suppressed by wiring the flat cables 30A and 30B in such a state that the flat cables 30A and 30B are superimposed with each other.

Second Embodiment

Figure 9:
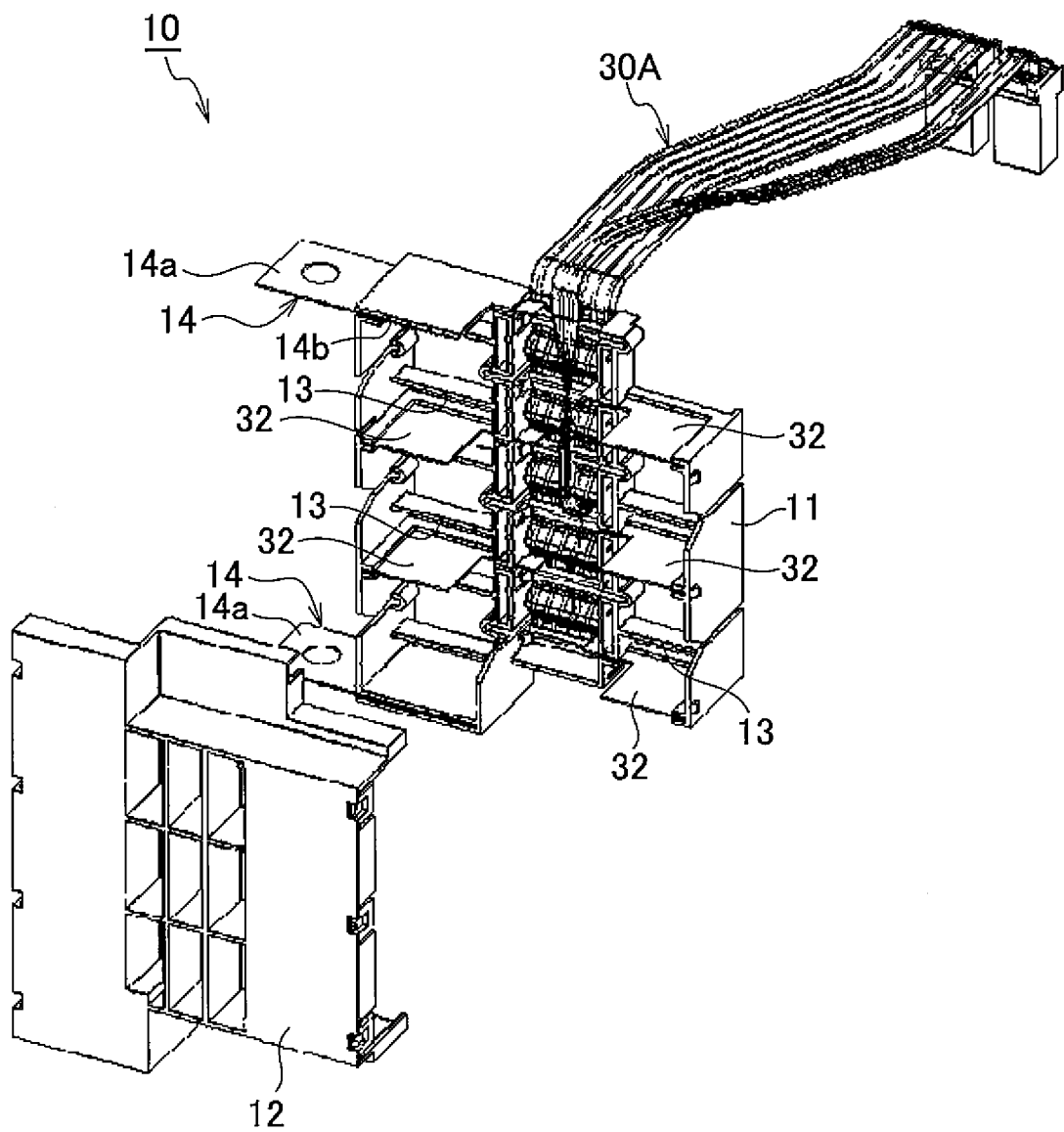
FIG. 9 shows a second embodiment of the present invention and is an exploded perspective view of one of insulating block bodies.
Figure 10:
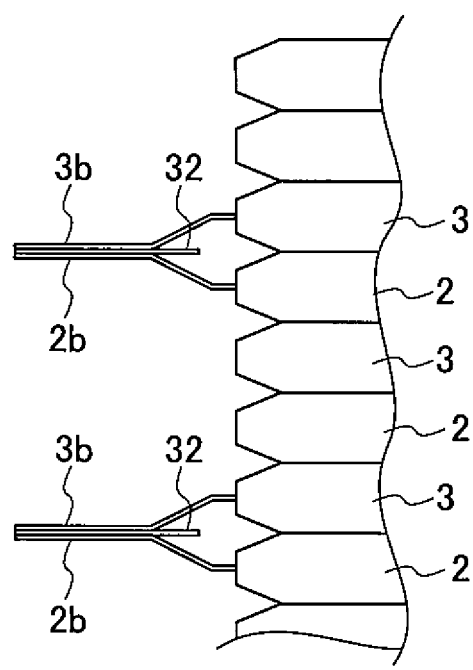
FIG. 10 shows the second embodiment of the present invention and is a cross-sectional view showing a connection state between a terminal connected to a flat cable and an electrode of a battery cell.

FIGS. 9 and 10 show a second embodiment of the present invention. In the second embodiment, a flat cable 30A as an electric wire for voltage detection is directly connected to a pair of electrodes 2b and 3b through a terminal 32 as a connecting portion. Hereinafter, this will be described.

As shown in FIG. 9, the terminal 32 as the connecting portion is connected to each conductor on the front end side of the flat cable 30A. Each of the terminals 32 is fixed to an insulating case body 11 at a position where each pair of the electrodes 2b and 3b of a battery assembly 2 projects. The terminal 32 is formed by a bus bar. The terminal 32 has a flat plate shape. Each pair of the electrodes 2b and 3b is arranged to hold the terminal 32 between them, as shown in FIG. 10. Each pair of the electrodes 2b and 3b and each of the terminals 32 of the flat cable 30A are connected by resistance welding or the like.

A similar constitution is adopted in the insulating case body side of the other insulating block body.

Since other constitutions are similar to those of the first embodiment, redundant explanations thereof are omitted. The same constitutional portions in the drawings are indicated by the same reference numerals for clarity.

Also in the second embodiment, since the terminal 32 of the flat cable 30A held in the insulating block body 10 and the pair of the electrodes 2b and 3b of the battery cells 2 and 3 adjacent to each other are directly connected to each other, the connection between the pair of the electrodes 2b and 3b and the voltage information of the electrode position can be obtained with the smaller number of components than that in the relevant examples, and more specifically by using only the terminal 32. Accordingly, if the number of the battery cells 2 and 3 increases, the increases in the number of components and the working man-hours can be suppressed as much as possible, and, in addition, size reduction and weight saving of the power supply device can be achieved.

Other Embodiments

In a variation of each of the above embodiments, the following constitution will be considered. In a state before the insulating block bodies 10 and 20 are installed in the battery assembly 1, the pair of the electrodes 2b and 3b of the adjacent battery cells 2 and 3 are arranged at an interval. The insulating case bodies 11 and 21 of the insulating block bodies 10 and 20 each include an electrode guide portion regulating an interval between the pair of the electrodes 2b and 3b inserted into each of the electrode insertion holes 13 in a direction narrowing the interval.

When the insulating block bodies 10 and 20 are made close to each other so as to be arranged on the electrode projecting side of the battery assembly 1, each pair of the electrodes 2b and 3b is inserted into the electrode insertion hole 13. Then, the conductor 31 and the terminal 32 of the flat cables 30A and 30B are inserted in a space between each pair of the electrodes 2b and 3b, and as the insertion progresses, the interval between each pair of the electrodes 2b and 3b is gradually narrowed by the electrode guide portion. When each pair of the electrodes 2b and 3b is inserted to an insertion completion position, the conductor 31 and the terminal 32 of the flat cables 30A and 30B are in a state of being held between the pair of the electrodes 2b and 3b.

In the above variation, in the process of operation of assembling the insulating block bodies 10 and 20 on the battery assembly 1, the conductor 31 and the terminal 32 of the flat cables 30A and 30B are automatically held between the pair of the electrodes 2b and 3b, and therefore, the workability is enhanced.

The flat cables 30A and 30B are flat belt-like cables and, for example, flexible flat cables (FFC) or flexible printed substrates (FPC).

The present invention has been described based on an embodiment, but the present invention is not limited to such an embodiment and the component of each unit can be replaced by a unit of any configuration having a similar function.

What is claimed is:

1. A power supply device comprising:
    a battery assembly including stacked battery cells, the stacked battery cells respectively including electrodes protruding from opposite sides across the stacked battery cells, a pair of the electrodes of adjacent ones of the stacked battery cells facing each other;
    a connecting portion of an electric wire for voltage detection directly connected to the pair of the electrodes of the adjacent ones of the stacked battery cells arranged to face each other; and
    an insulating block body disposed on a side on which the pair of the electrodes of the battery assembly project, including the electric wire for voltage detection wired in the insulating block body, and configured to hold the connecting portion of the electric wire for voltage detection,
    wherein the connecting portion of the electric wire for voltage detection is held between and in direct contact with inner surfaces of the pair of the electrodes, the inner surfaces facing each other.

2. The power supply device according to claim 1, wherein the connecting portion of the electric wire for voltage detection is a conductor of the electric wire for voltage detection.

3. The power supply device according to claim 1, wherein the insulating block body comprises:
    an electrode insertion hole for the pair of the electrodes to be inserted; and
    an electrode guide portion configured to regulate an interval between the pair of the electrodes inserted into the electrode insertion hole, the interval extending in a direction in which the stacked battery cells are stacked on each other.

4. The power supply device according to claim 1, wherein the electrodes protrude from opposite sides across the stacked battery cells,
    the pair of the electrodes of the adjacent ones of the stacked battery cells protrude from a first side of the opposite sides, and
    the insulating block body is disposed on the first side on which the pair of the electrodes of the battery assembly project.

5. The power supply device according to claim 4, further comprising a second insulating block body disposed on a second side of the opposite sides and configured to insulate a second pair of the electrodes protruding from the second side.

6. The power supply device according to claim 4, wherein the stacked battery cells comprise first battery cells alternatingly stacked with second battery cells, and
    in a cross sectional view through a width and a height of the stacked battery cells, the width is perpendicular to longitudinal directions of each of the stacked battery cells and the height is a direction in which the stacked battery cells are stacked,
    ones of the electrodes of the first battery cells are arranged at a same position along a longitudinal direction of the first battery cells, and
    ones of the electrodes of the second battery cells are arranged at different longitudinal positions of the second battery cells.

7. The power supply device according to claim 6, wherein one of the second battery cells is arranged directly between a pair of the first battery cells, and
    one of the first battery cells is arranged directly between a pair of the second battery cells.

8. The power supply device according to claim 7, wherein the stacked battery cells comprise series connections alternating in series between the opposite sides in a direction in which the stacked battery cells are stacked.

* * * * *